United States Patent Office 3,605,768
Patented Sept. 20, 1971

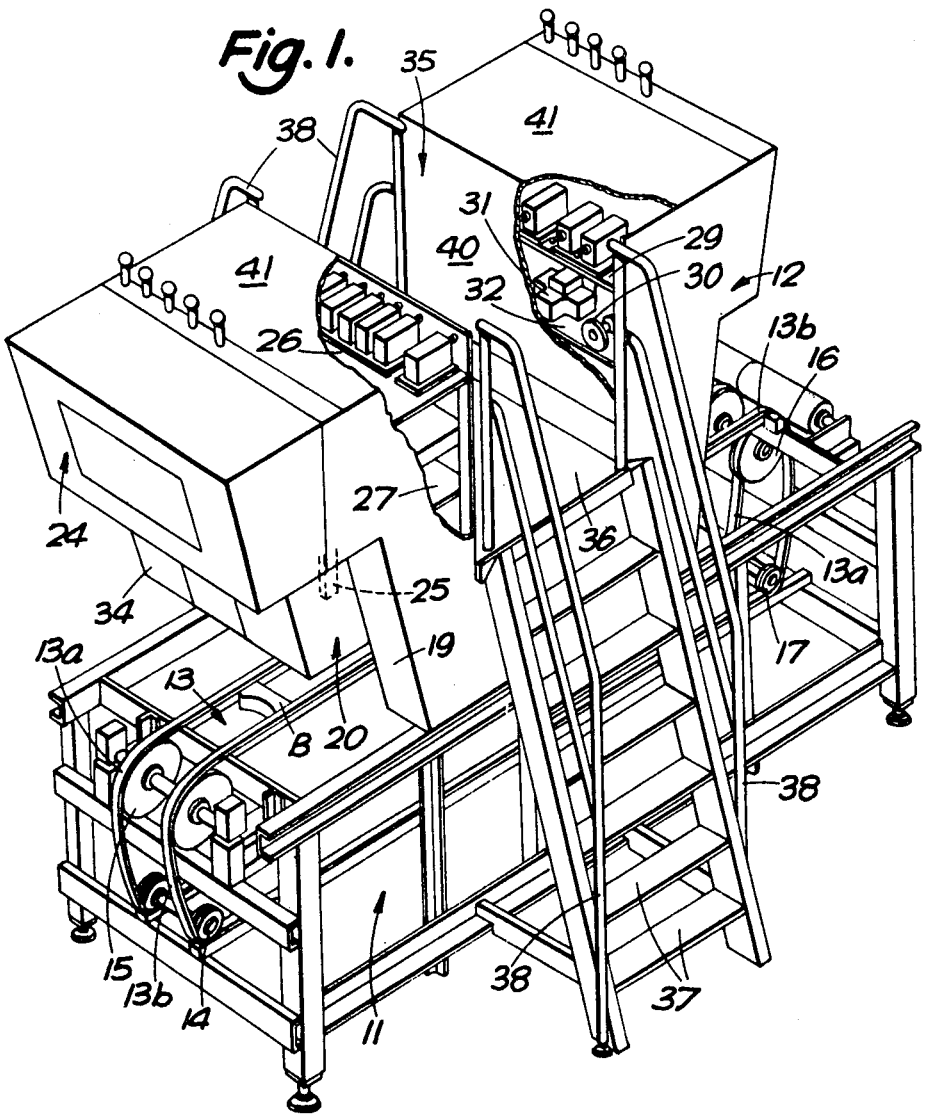

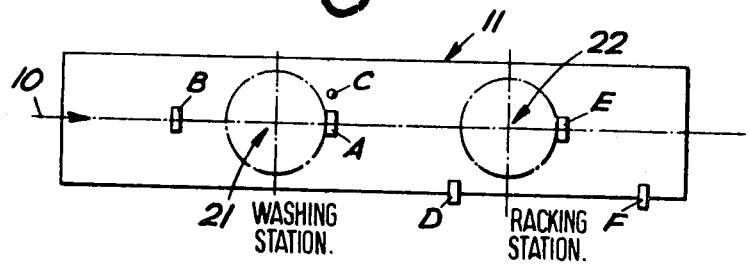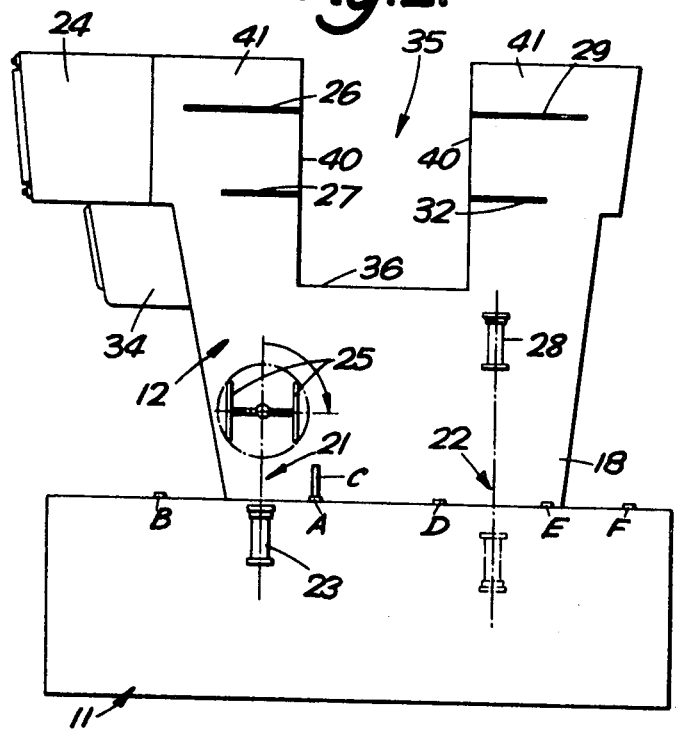

3,605,768
APPARATUS FOR WASHING AND FILLING CONTAINERS FOR LIQUIDS
Cyril George Golding, Bilston, England, assignors to GKN Sankey Limited, Bilston, England
Filed Oct. 14, 1969, Ser. No. 866,299
Claims priority, application Great Britain, Oct. 14, 1968, 48,634/68
Int. Cl. B08b 3/02
U.S. Cl. 134—62
10 Claims

ABSTRACT OF THE DISCLOSURE

A combined washing and racking machine for beer kegs comprises a conveyor for conveying a succession of kegs past a washing station and then past a racking station at spaced positions along the conveyor. An upper unit extends over the washing station forming a tunnel through which the kegs pass. Pneumatically operated turnover arms are mounted on the tunnel walls and arranged to grip a keg at the washing station and invert it before passing on to the racking station.

---

The invention relates to a combined washing and racking machine for containers for liquids, such as beer kegs.

The invention provides a combined washing and racking machine for containers for liquids, such as beer kegs, which machine comprises conveying means for conveying a succession of containers along a path through the machine, washing means at a washing station, racking means at a racking station spaced along said path from the washing station, and turnover means adjacent the washing station arranged to grip a container at the washing station and invert it before passing on to the racking station.

Preferably the turnover means comprise two rotatable gripping devices mounted on opposite sides of the conveyor path.

Preferably pneumatic means are provided for moving the gripping devices towards each other to grip a container.

Preferably the gripping devices comprise rotatable arms provided with heat resistant pads for abutting the container.

Preferably the machine comprises an upper unit and a lower unit, the lower unit including the conveying means which provides a conveying path along the top of the lower unit, the upper unit forming a tunnel over the lower unit and the said gripping devices being mounted on opposite walls of the tunnel.

Preferably pneumatic means is provided for causing rotary movement of the gripping devices to invert a container.

A specific embodiment of the invention will now be described by way of example and with reference to the accompanying drawings in which:

FIG. 1 is a perspective view of a combined washing and racking machine for beer kegs;

FIG. 2 is a diagrammatic sectional side view of the machine, and

FIG. 3 shows diagrammatically a plan view of the conveyor path.

In this example, the machine consists of a lower unit 11 and an upper unit 12. The lower unit 11 includes a self supporting framework adapted to stand on the floor. A chain conveyor 13, comprising two spaced chains 13a and 13b running over rollers, 14, 15, 16 and 17 fixed to the framework and driven by an electric motor (not shown), is adapted to convey a succession of beer kegs on a straight path along the top of the lower unit 11. The upper unit 12 is mounted on the lower framework 11, and forms a bridge extending above and across the conveyor path. The upper unit has two side walls 18 and 19 which are supported on the lower unit and are spaced apart to form a tunnel 20 through which the beer kegs may be conveyed on the conveyor 13.

In use, beer kegs are passed onto the conveyor 13 in the inverted position at the left hand side of FIG. 2 and pass through the tunnel 20 from left to right as shown by the arrow 10 in FIG. 3. The kegs first pass to a washing station at position 21 and then to a racking station 22 where the kegs are filled. The filled containers leave the machine at the right hand end of the conveyor 13. A washing head 23 is mounted on the lower unit 11 and is movable pneumatically to rise and engage the outlet of each inverted keg when it arrives at the washing station.

Each keg may have two concentric apertures controlled by a valve unit, the central aperture being connected to a down pipe in the container, such as that shown in the commonly owned British Pat. No. 958,111.

The washing head 23 has two similar concentric passages adapted to connect with the two concentric passages in the keg outlet. On entering the washing station the keg strikes a locating stop A so that the keg is located centrally over the washing head 23 which is then caused to rise and clamp the keg between the washing head and a pneumatically operated head stop (not shown) mounted in the roof of the tunnel 20. When the keg hits the stop A, slight movement of the stop A is used to cause upward movement of a plate stop B forward of the washing station 21 to prevent the next keg entering the station 21 while washing is in progress. The condition of the seal of the washing head 23 onto the neck of the keg and the condition of the valve unit in the keg outlet are then tested. If satisfactory, a probe in the washing head 23 rises to open the valve unit in the keg, and the keg is ready for the washing cycle. Immediately after the washing cycle commences, the locating stop A is retracted below the level of conveyor 13. The washing cycle consists of the following operations carried out in succession:

Check seal of washing head of neck and check valve outlet in neck
Open valved outlet in neck
Cold water rinse
Steam ejection of cold water
Detergent wash
Steam ejection of detergent
Hot water rinse
Sterilise All the operations except sterilising are time controlled and sterilising is controlled by steaming until a required temperature is reached and then steaming at that temperature for a controlled time. Alternative control by time only or temperature only is available by selection of switching in a control box 24 mounted in the upper unit 12.

Just prior to completion of the washing cycle rotatable turnover arms 25 mounted on opposite sides of the washing station 21 on the sides 18 and 19 of the upper unit, are moved inwardly to grip the keg. The axis of rotation of the arms is arranged at a suitable height above the conveyor path so that the keg is gripped just below its centre of gravity. When the washing cycle is completed, the washing head 23 and head stop are retracted pneumatically away from the keg and the keg is turned over to the upright position ready to proceed to the racking station 22.

As is shown diagrammatically in FIG. 2, a pair of parallel arms 25 are provided on each side of the conveyor path. The two arms of each pair are straight and spaced apart so as to abut different parts of the container's periphery. The two arms of each pair are mounted on a common rotary shaft mounted in the side walls 18 and 19 of the upper unit 12.

The turnover arms 25 are mounted on the same centre line as the washing head 23 and are pneumatically operated by a piston and cylinder device (not shown) to assist the turnover of the keg due to its own weight. Each of the turnover arms 25 has a lifting pad of heat resistant rubber for gripping the sides of the keg. The movement of the washing head 23 and the probe within the washing head are operated separately by pneumatic pistons. All pneumatic equipment and pressure switches for controlling the washing operation and movement of the turnover arms 25 are mounted on a common tray 26 above the washing station in the upper unit 12. A heat sensing device is fitted at the washing station. This device senses the temperature of the container during the first steam ejection operation. Failure to achieve a set temperature in a set time causes the washing cycle to be stopped. The faulty container is only removable from the washing head 23 by operating a manual reject button in the control box 24 on the upper unit 12. A flashing indicator light is provided on the control box to indicate a faulty keg. The inlet supply to the washing head 23 is controlled by five valves of a diaphragm and poppet type which are pneumatically operated. The five valves are mounted in a common block located on a tray 27 below the pneumatics tray 26. Two exhaust stop valves are provided to give a changeover between passing the exhaust to waste and detergent recirculation. Hot water, cold water and steam are exhausted to waste. Override buttons for manual operations are mounted on the pneumatics tray 26. The head stop is pneumatically operated and incorporates a quick change positioning device for resetting to suit different sizes of beer keg.

When the washed keg leaves the washing station 21 it proceeds to the racking station 22. At a point forward of the racking station 22 the keg operates a micro pilot valve D which retracts the stop B and raises the stop A at the washing station so that the next keg may now move into and be stopped at the washing station 21.

As the keg enters the racking station 22 it strikes an upstanding location stop E which is normally raised and is located to position the keg exactly under a racking head 28. The racking head is generally similar to the washing head 23 except that it is mounted above the keg so as to fill the keg in the upright position. A lifting table (not shown), somewhat similar to the head stop at the washing station, is located below the conveyor 13 underneath the racking head 28 and rises pneumatically to lift the keg off the conveyor chain and the racking head 28 descends to form a seal on the keg neck. The seal between the racking head 28 and the keg neck is checked before the valve outlet of the keg is opened. If satisfactory, a probe in the racking head 28 descends to open the outlet in the keg and the keg is ready for the filling cycle.

When the lifting table rises, a peg stop C is raised which prevents a washed keg from leaving the washing station 21 until the keg being currently racked is clear of the racking station 22. As the racking test commences, stop E is lowered. When the racking cycle is completed, the lifting table drops and the racking head 28 is raised. The full keg then leaves the racking station 22 and strikes a micro pilot valve F downstream of the racking station 22 which raises the stop E ready for the next keg entering the racking station 22. Lowering of the lifting table also lowers peg stop C allowing the washed keg to proceed for racking.

The sequence for operations at the racking station is as follows:

Check seal of head 28 onto neck and location of keg
Open valve outlet in keg
Steam to sterilise the head 28 valve unit in keg outlet and complete keg sterilisation where necessary
Carbon dioxide purge and pressurise (and water cool externally if desired)
Fill
Save beer in the pipelines leading to the racking head The steaming, carbon dioxide and beer save operations are controlled by time only. Filling is controlled by metering the amount of beer through a metering system or by completely filling the container and using a pressure switch to detect pressure of liquid in an overflow pipe.

The washing unit and racking unit is somewhat similar to an earlier devised washing apparatus and to an automatic racking machine shown in U.S. Pat. No. 3,392,034. In this case however where the washing and racking are combined in one machine, the time taken at this washing station 21 and racking station 22 must be balanced so as to maintain uniform flow of kegs through the machine. For this reason, the sterilisation of the interior of the keg is carried out at the washing station 21 and need not necessarily be done at the racking station.

All pneumatic equipment and pressure switches for controlling the racking operation are mounted on a tray 29 above the racking station similar to the pneumatics tray 26 above the washing station. Inlet and exhaust valves 30 for controlling the racking operation are similar to the valves used for the washing operation and are similarly mounted in two common blocks on a tray 32 below the pneumatics tray 29. The meter 31 for measuring the amount of beer fed into each keg is also mounted on the tray 32.

A temperature recorder and controller 34 is fitted and is located below the control box 24. Override buttons for manual operation of the racking operation are fitted on the pneumatics tray 29. Blow off valves of the pneumatically operated type are fitted to the steam, gas and beer exhaust lines. A flashing indicator light to indicate carbon dioxide failure are fitted on the control box 24.

As shown in FIG. 2, the machine is for filling containers with the neck uppermost. However, the racking unit may be adjusted so as to enable containers to be filled in the inverted position. The racking head 28 and lifting table may each be removed from their mountings and the racking head 28 re-mounted in place of the lifting table below the conveyor 13.

A further head stop similar to that used above the washing station 21 can then be fitted to the mounting previously used to fix the racking head 28 above the conveyor 13. In this case, the racking head in the lower position and head stop in the upper position are moved pneumatically similar to the washing head and head stop at the washing station.

The control box 24 is fitted on the forward end of the machine facing an operator position and contains all the electric controls for both the racking and washing units. The control box 24 comprises a box made from aluminum sheet having a removable front panel. Visibly mounted behind this panel are clock timers and all the necessary relays mounted in two banks on either side of the timers. The timers and relays together with all other electrical equipment are mounted on one hinged plate capable of dropping forward to give ease of access to wiring and connections for servicing and maintenance. Switches in the box 24 allow the washing and racking operations to be operated independently when necessary.

In order to provide convenient access for servicing and maintenance, a service gantry 35 is provided. This consists of an elevated platform 36 forming a bridge across the conveyor path above the line of kegs passing through the machine. The trays 26, 27, 29 and 32 are all conveniently accessible to an operator on the platform 36.

In the particular machine shown the length of the lower unit 11 is approximately 9 feet. The machine may wash and fill 9, 10 or 11 gallon kegs. The speed of the conveyor 13 is 30 feet per minute. The time taken for the washing cycle of a nine gallon container may be about 2 minutes. The racking time would be the same.

The invention is not restricted to the details of the foregoing example.

I claim:

1. A combined washing and racking machine for containers for liquids, such as beer kegs, which machine comprises; a conveyor for conveying a succession of containers along a path through the machine; a washing station and a racking station spaced apart along the path; washing means at the washing station for washing inverted containers and racking means at the racking station for racking upright containers, said washing means comprising a washing head mounted for movement between a position below said conveyor and a position above said conveyor; means to raise and lower said washing head; and rotatable turnover means arranged for gripping a container at the washing station; the machine being arranged to operate in a cycle in which each of a succession of containers is, in turn, conveyed in the inverted condition to the washing station by said conveyor, raised off said conveyor by raising of said washing head to engage and lift the container, washed by said washing means, gripped by said turnover means and, after said washing head has been lowered to disengage from the container, turned over into an upright position by said turnover means and released to be carried to the racking station by said conveyor.

2. A combined washing and racking machine as claimed in claim 1 in which said turnover means are positioned for gripping a container below its centre of gravity, so that the weight of each container assists the turnover operation.

3. A combined washing and racking machine as claimed in claim 1 in which said turnover means comprise two rotatable gripping devices mounted on opposite sides of the conveyor path.

4. A combined washing and racking machine as claimed in claim 3 in which pneumatic means are provided for moving said gripping devices towards each other to grip a container.

5. A combined washing and racking machine as claimed in claim 1 in which said means to raise and lower the washing head comprises a pneumatic piston and cylinder.

6. A combined washing and racking machine as claimed in claim 3 in which said gripping devices comprise rotatable arms provided with heat resistant pads for abutting the container.

7. A combined washing and racking machine as claimed in claim 3 in which the machine comprises an upper unit and a lower unit, said lower unit including said conveying means which provides a conveying path along the top of said lower unit, said upper unit forming a tunnel over said lower unit and the said gripping devices being mounted on opposite walls of the tunnel.

8. A combined washing and racking machine as claimed in claim 7 including a stop member mounted on the roof of the tunnel above the washing station and pneumatic means for raising and lowering said stop between a lower position in which a container may be clamped between said stop and said raised washing head, and an upper position in which said stop is clear of a container being turned over by said gripping devices.

9. A combined washing and racking machine as claimed in claim 3 in which pneumatic means is provided for causing rotary movement of said gripping devices to turn over a container.

10. A combined washing and racking machine for containers for liquids, such as beer kegs, comprising a base portion, an upper portion forming a tunnel over the base portion, a chain conveyor comprising spaced chains running over rollers mounted on the base portion for conveying containers through the tunnel, a washing station and a racking station spaced apart along the tunnel, washing means at the washing station comprising a washing head mounted for movement between a position below said conveyor and a position above said conveyor for washing inverted containers, racking means at the racking station for racking upright containers, pneumatic means to raise and lower said washing head, a stop member mounted on the roof of the tunnel above the washing station, pneumatic means for raising and lowering said stop, two pairs of arms mounted at the washing station on opposite sides of the tunnel and carrying heat resistant pads, pneumatic means for moving said two pairs of arms towards and away from one another, and pneumatic means for rotating said two pairs of arms, the machine being arranged to operate in a cycle in which each of a succession of containers is, in turn, conveyed in the inverted condition to the washing station by said conveyor, raised off the conveyor and clamped between the washing head and said stop by raising of said washing head, washed by said washing means, gripped below its centre of gravity between said heat resistant pads by movement of said two pairs of arms towards one another, and, after said washing head has been lowered and said stop raised to disengage from the container, is turned over into an upright position by rotation of said two pairs of arms and released to be carried to the racking station by the conveyor.

References Cited

UNITED STATES PATENTS

| 3,166,106 | 1/1965 | Reeve et al. | 141—91 |
| 3,277,929 | 10/1966 | Cook | 141—92 |

FOREIGN PATENTS

| 75,698 | 8/1954 | Netherlands | 141—92 |

HOUSTON S. BELL, JR., Primary Examiner

U.S. Cl. X.R.

134—152, 167; 141—92